JOSEPH T. McNANEY
INVENTOR.

JOSEPH T. McNANEY
INVENTOR.

JOSEPH T. McNANEY
INVENTOR.

JOSEPH T. McNANEY
INVENTOR.

3,101,233
Patented Aug. 20, 1963

3,101,233

BINARY CODE ACTUATED ALPHANUMERIC SYMBOL PRESENTATION APPARATUS

Joseph T. McNaney, 8548 Boulder Drive, La Mesa, Calif.

Filed Apr. 13, 1961, Ser. No. 102,709
20 Claims. (Cl. 346—107)

This invention relates to an improved apparatus for converting binary code input data to alphanumeric symbols and more particularly to the employment of this novel apparatus in combination with communication printers and photocomposing machines.

In equipments of these types improvements are in great demand with regard to higher operating speeds, higher operating efficiencies, lower equipment costs and reduction in size, without any sacrifice in print quality.

It is an object of my invention to greatly minimize the complexity of such equipments which is largely responsible for their present shortcomings by providing an improvement in the apparatus necessary to convert the binary code input data to decimalized functions which are in turn converted to symbolic counterparts of the input data. My invention is intended to provide the necessary improvements in the operation and efficiency of known approaches to the problems of printing while maintaining high standards of print quality.

Other objects and features of my invention will be readily apparent to those skilled in the art from the following specification and appended claims illustrating certain preferred embodiments of this invention in which:

Figures 1, 2, 3:
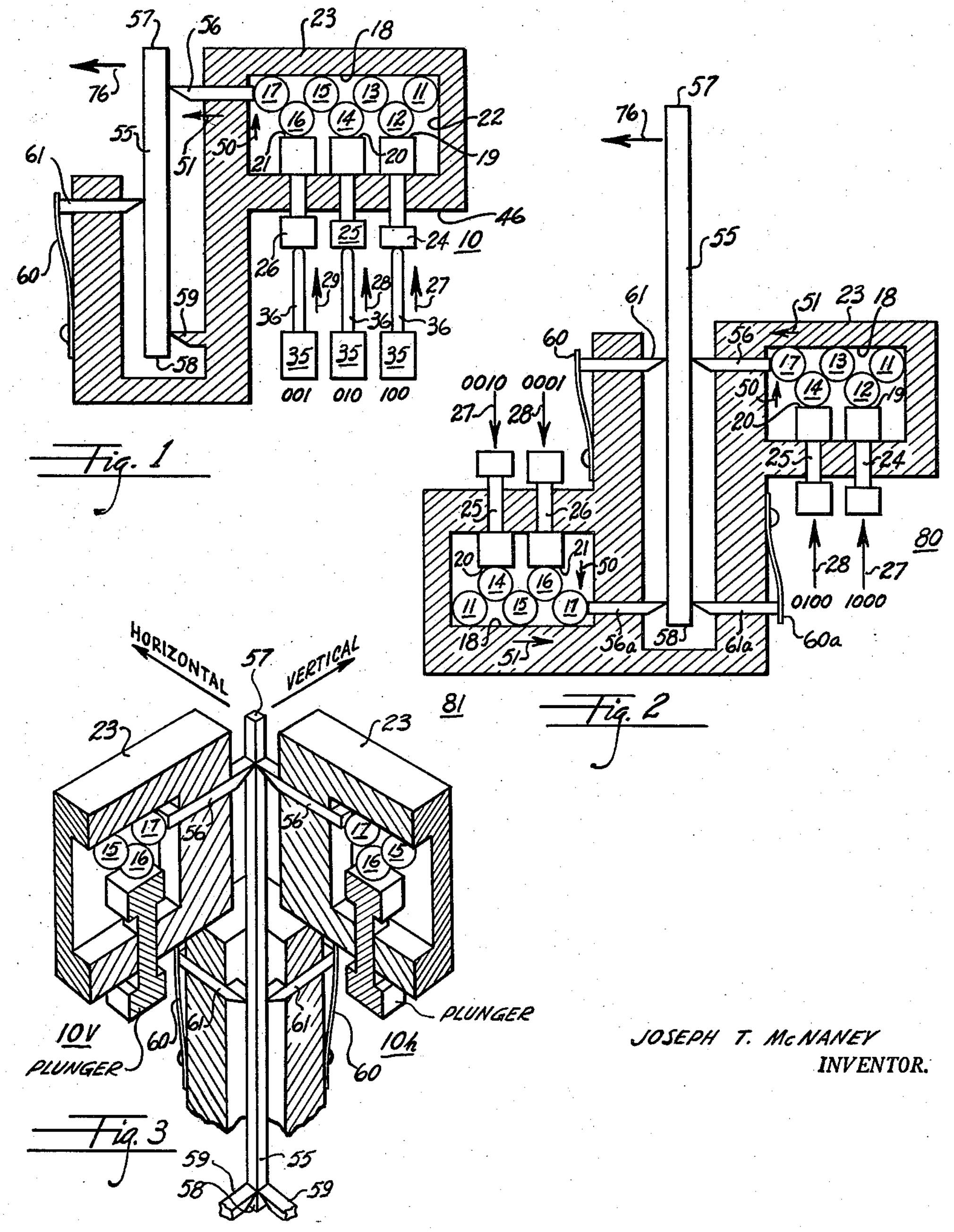
FIGURE 1 shows a partial sectional view of a binary code to decimal converter embodiment of my invention.
FIGURE 2 shows a partial sectional view of a further embodiment of my binary code to decimal converter improvement.
FIGURE 3 shows a perspective view and further variation of the embodiment shown in FIGURE 1.

In my copending application, Serial No. 81,561, filed January 9, 1961, a force to motion converter has been disclosed which has as one of its objectives the capability of converting binary coded input commands into decimalized functions of such commands. This particular objective is made possible by means of a series of bearings adjoining one another in a zig-zag side-by-side relationship and selectively adjacent to surface members on opposite sides of the zig-zag series of bearings. One of the end bearings in the series of bearings is biased against a fixed support and therefore identified as a reference bearing, and a bearing at the opposite end of the series of bearings is referred to as an output bearing. When the zig-zag side-by-side relationship of the series of bearings is altered by the impartment of displacements, respectively, to the surface members on one side, or to surface members on the opposing sides, of the series of bearings the position of the output bearing with respect to the reference bearing will be altered accordingly.

Since a plurality of surface members may be utilized on opposing sides of the zig-zag series of bearings with the capability of being displaced, numerous combinations of surface member displacements may be made. These displacements may be made under the control of binary coded input commands and thereby alter the zig-zag side-by-side relationship of the series of bearings accordingly. For each such alteration the output bearing will be made to assume a position with respect to the reference bearing that corresponds to a set of binary coded surface member displacements. If a 3-digit binary code command signal is to be converted to a decimalized displacement of the output bearing with respect to the reference bearing the converter will then utilize at least three surface members capable of being displaced. A first member will be under the control of the binary code 001; the second member under control of binary code 010; and the third member under control of binary code 100.

In my copending application referred to above there will be at least one bearing of a given series of bearings adjacent to the first surface member; at least two bearings of the series adjacent to the second member, or two times the number of bearings adjacent to the first member; and at least four bearings of the series adjacent to the third member, or four times the number of bearings adjacent to the first member. Under these circumstances of correlating the number of bearings used adjacent to each surface member with the system of binary codes, the mechanical displacements imparted to the surface members, the displacement of one member with respect to the other, will be of equal magnitudes.

Referring now to the present invention, it also utilizes a series of bearings adjoining one another in a zig-zag side-by-side relationship and selectively adjacent to respective surface members on opposite sides of the zig-zag series arrangement, wherein a reference bearing is included at one end of the series of bearings and an output bearing is included at the opposite end of the series.

In the FIGURE 1 embodiment of my invention a unit 10 is shown to contain a zig-zag series of bearings 11, 12, 13, 14, 15, 16 and 17, adjoining one another in a side-by-side adjacency and selectively adjacent to respective surface members 18, 19, 20 and 21, on opposite sides of the series of bearings. The bearings 11, 13, 15 and 17 are adjacent to surface 18; bearing 12 is adjacent to surface 19; bearing 14 is adjacent to surface 20; and bearing 16 is adjacent to surface 21. The bearing 11 at one end of the series of bearings is a reference bearing and is also adjacent to an end surface 22. The surfaces 18 and 22 are part of a support frame 23. The surface 19 is part of a plunger assembly 24; surface 20 is part of a similar plunger 25; and surface 21 is part of a third and similar plunger 26. The plungers 24, 25 and 26 are adapted to respond to force and motion applied in the direction of arrows 27, 28 and 29, respectively.

In the embodiments of the invention a similar number of bearings are adjacent to, and under the control of, the respective surfaces 19, 20 and 21. The particular number of bearings adjacent to the respective surfaces, therefore, are not necessarily related to a system of binary codes. But instead, the mechanical displacements imparted to plungers 24, 25 and 26, and to surface members 19, 20 and 21, will be of different magnitudes and, thereby, make it possible to correlate bearing displacements with a system of binary codes. The plunger 26 will be under the control of binary code 001, and the motion imparted to surface 21 will be equal to a predetermined magnitude; the plunger 25 will be under the control of binary code 010, and the motion imparted to surface 20 will be two times the magnitude imparted to surface 21; the plunger 24 will be under the control of binary code 100, and the motion imparted to surface 19 will be four times the magnitude of motion imparted to surface 21.

Figures 4, 5, 6:
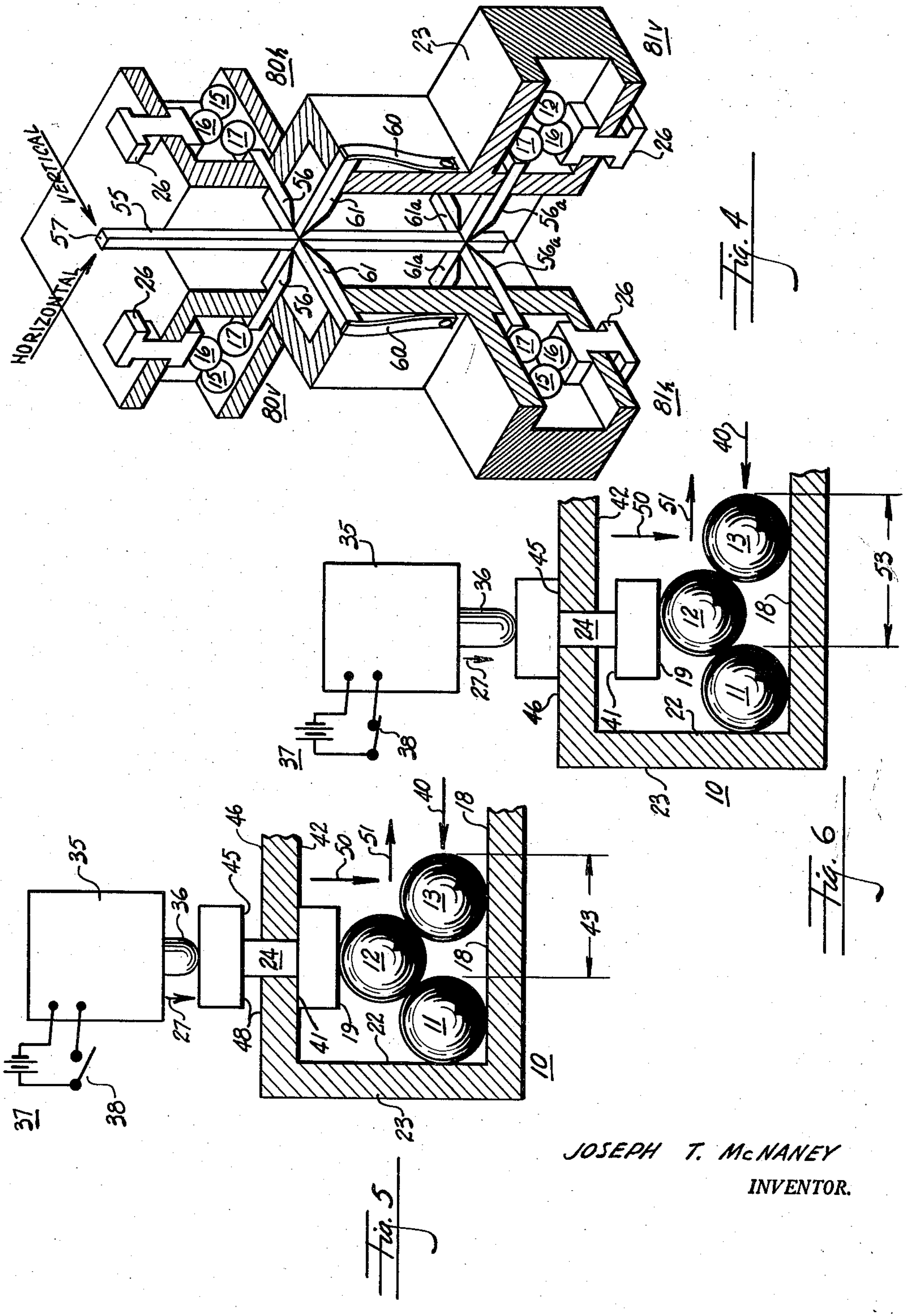
FIGURE 4 shows a perspective view and further variation of the embodiment shown in FIGURE 2.
FIGURES 5 and 6 show partial sectional views of mechanical details of FIGURES 1, 2, 3, 4 and 11.

Referring now to FIGURES 5 and 6, partial sectional views of unit 10 is shown, wherein one of the plungers 24 has been included to describe in more detail the manner in which each of the plungers 24, 25 and 26 will cooperate with their respective bearings 12, 14 and 16. In FIGURE 5, the plunger 24 is shown in what may be termed as a "digit-0" position, and in FIGURE 6, the plunger 24 is again shown, but, in what may be termed as a "digit-1" position.

An actuator 35 has an output plunger 36 capable of being thrust against plunger 24 in the direction of arrow 27 when energized from an electrical source 37 through a switch 38. Actuator 35 may be, for example, one of many of the presently available electro-magnetic type actuators. Or, preferably, a piezoelectric transducer force to motion converter of the type shown and described as FIGURE 2 in my copending application referred to above.

When the plunger 24 of the unit 10 is in a digit-0 position it is held firmly against the support frame 23 by a restraining force in the direction of arrow 40. Under the latter conditions a surface 41 of the plunger 24 will be seated against a surface 42 of the support frame 23. Also under these conditions the series of bearings will be held firmly against frame surfaces 18 and 22, and plunger surface 19, and the bearing 13, for example, will then be at what may be termed a pre-set dimension 43 with respect to the reference bearing 11.

When the plunger 24 of the unit 10 is in a digit-1 position, the force and motion imparted to the plunger 24 from the actuator 35 causes a surface 45 of the plunger to be seated firmly against a surface 46 of the support frame 23. The displacement imparted to the plunger 24 and the surface 19 adjacent to bearing 12, will be equal to a predetermined distance 48 the plunger 24 was permitted to travel when changed from a digit-0 position to a digit-1 position. The impartment of motion to the surface 19 will cause the bearing 12 to be displaced in the direction of arrow 50, and also in the direction of arrow 51 with respect to the reference bearing 11. Consequently, the bearing 13 will also be displaced in the direction of arrow 51, advancing the latter bearing from a pre-set dimension 43 with respect to the reference bearing 11, to a displaced dimension 53 with respect to bearing 11.

Referring once again to FIGURE 1, it should be understood that the remaining bearings 14, 15, 16 and 17 in the series will be displaced in the direction of arrow 51 an amount equal to a displacement of the bearing 13. When force and motion is imparted to plungers 25 and 26, bearings 14 and 16, respectively, will be displaced in a similar manner, which in turn will be followed by displacements of bearings 15 and 17, respectively. However, as indicated previously, the magnitude of the displacement of plunger 25 will be one half of that imparted to plunger 24, and the magnitude of the displacement of plunger 26 will be one quarter of that imparted to plunger 24. In the case of each plunger 24, 25 and 26, the distance of their permitted displacements is precisely controlled by the spacing between a surface 45 of each plunger, and the surface 46 of the support frame 23. In view of the preciseness and the manner in which the bearings 12, 14 and 16 may be displaced with respect to an initial zig-zag side-by-side series arrangement, the output bearing 17 can be made to assume eight different positions with respect to the reference bearing 11 in response to the commands of a 3-digit binary code signal that may be coupled to a system of three actuators 35 associated, respectively, with plungers 24, 25 and 26..

The eight different positions the output bearing 17 can be made to assume represent decimalized output functions of the binary code input functions, 000 through 111, applied to the plungers 24, 25 and 26 of the converter unit 10. These decimalized functions are imparted to a lever 55 by means of a mechanical linkage 56 between the output bearing 17 and the lever 55. The lever 55 has an output end 57 which is movable, and a reference end 58, near which the lever is supported against a fulcrum 59, and about which decimalized output functions may be imparted to the lever 55. A spring means 60 is adapted through a mechanical linkage 61 to force the lever 55 against the fulcrum 59, and also against the series of bearings, 11, 12, 13, 14, 15, 16 and 17 through a linkage 56 forcing the series of bearings against the adjacent surfaces 19, 20, 21, 22 and 18.

In the description of the invention thus far, the bearing 11 has been referred to as a reference bearing 11. In the sense that the word bearing is used in this connection it need not necessarily be an undivided part of the support frame 23, but instead the reference bearing 11 could be an actual part of the frame 23. A reference bearing 11 supported against surfaces 18 and 22 of frame 23 has been so shown merely to assist in describing the invention and should be so understood. Also, in the above description the individual bearings 12, 13, 14, 15, 16 and 17 may be understood as being ball bearings, roller bearings, or bearings of other designs or configurations. These bearings may be, for example, triangular in shape and equally capable of functioning in a manner necessary to meet the objectives of this invention.

Figures 7, 8, 9, 10:
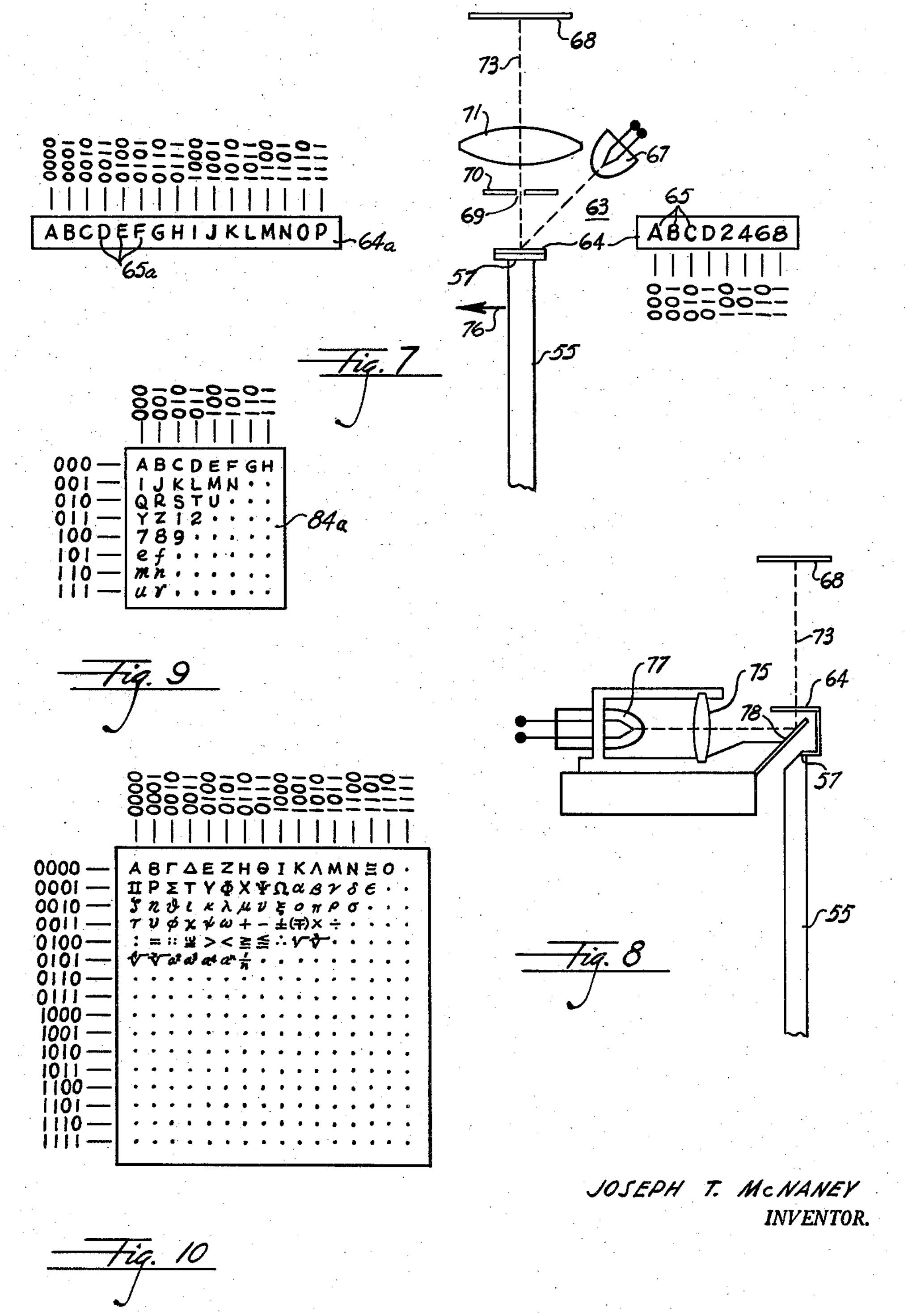
FIGURES 7 and 8 show partial sectional views of recorder means that may be used in combination with the binary code converter embodiments of FIGURES 1, 2, 3 and 4.
FIGURES 9 and 10 show plan views of alphanumeric symbol arrays of beam forming masks which may be used in the recorder means of FIGURES 7 and 8, and in the embodiment of FIGURE 11.

Referring now to FIGURE 7, one of several preferred photographic recorder means 63 is shown which may be used in combination with the binary code converter embodiments of FIGURES 1 and 2. An array 64 of message symbols 65, such as letters and numerals, is supported adjacent to the one end 57 of the lever 55 in a plane substantially perpendicular to the lengthwise dimension of the lever 55. The cross section of the individual symbols 65 are capable of reflecting light directed at their respective surfaces from a light bulb source 67. Independent light beams, the cross section of which are representative, respectively, of message symbols 65, are derived from the array 64 and imaged selectively on a light responsive medium 68 by means of a limiting aperture 69 in a mask 70, and a lens 71. The light source 67 is designed to illuminate a symbol aligned with the optical axis 73 of the recorder 63. In the event the light source 67 illuminates more than one symbol and perhaps symbols adjacent to the one aligned with the optical axis 73, the mask 70 will permit only the one symbol aligned with the optical axis 73 to pass through the aperture 69 and thereby be imaged on the medium 68. Different ones of the independent light beams representing different message symbols will be caused to impinge upon the light responsive medium 68 in response to the impartment of decimalized functions to the lever 55.

The array 64 is shown to contain, for example, symbols A, B, C, D, 2, 4, 6 and 8, in this order. The selection of these symbols for impingement upon the light responsive medium 68 will be under the control of binary code input functions corresponding to 3-digit binary numerals 000, 001, 101, 011, 100, 101, 110, and 111, respectively. The symbol A will be aligned with the optical axis 73 for record purposes when all of the plungers 24, 25 and 26 are in a digit-0 position, which position corresponds to a 000 binary code input function. The symbol B will be aligned with the optical axis 73 when plungers 24 and 25 are in digit-0 positions and the plunger 26 is in a digit-1 position, which positions correspond to a 001 binary code input function. Under the last stated conditions the mask 64 and the lever 55 will have been displaced in the direction of arrow 76 from an initial position, in response to a decimalized function imparted to the lever 55, which function is substantially proportional to the value of the binary code input function 001. The alignment of other symbols from the array of mask 64 with the optical axis 73 for record purposes, may be accomplished by additional mask 64 and lever 55 displacements in a similar manner under the control of succeeding binary code input functions.

Referring now to FIGURE 2, another embodiment of the invention is shown to include two series of bearings, respectively, of converter units 80 and 81, wherein, the bearings of each series adjoin one another in a zig-zag side-by-side relationship and are selectively adjacent to a surface 18 of a support frame 23 on one side of said series, and surfaces of plungers on the opposite side of said series of bearings. There is a reference bearing means 11 at one end of each series of bearings adjacent to surface 22 of frame 23, and mechanical linkage means 56 and 56*a*, respectively, at the opposite end of each series of bearings by which the lever 55 is adjoined to each of said series. The lever 55 has an output end 57 which end is movable with respect to the linkage means 56 which means also serves as a fulcrum 56. The end 57 is movable also with respect to the linkage means 56*a* which means also serves as a fulcrum 56*a*. Decimalized functions derived from the converter units 80 and 81 may therefore be imparted to the lever 55 with respect to the fulcrum 56*a* and 56, respectively. The fulcrum 56*a* engages the lever 55 near the one end 58 of said lever, and the fulcrum 56 engages the lever 55 at a point between the opposite ends 57 and 58 of said lever. A spring means 60 is adapted through a mechanical linkage 61 to force the lever 55 against the fulcrum 56, and a spring means 60*a* is adapted to force the lever 55 against the fulcrum 56*a* through a mechanical linkage 61*a*. In each case the series of bearings of the respective converter units 80 and 81 are forced against the adjacent surfaces 18 and 22 of the frame 23, and also against the surfaces of their respective plungers.

From the standpoint of their operating principles the converter units 80 and 81 of FIGURE 2, and the converter unit 10 of FIGURE 1, are similar. In FIGURE 1 the converter unit 10 is intended to respond to a system of 3-digit binary code input functions, while the converter units 80 and 81 of FIGURE 2 are intended to respond to 2-digit binary code input functions, respectively. In combination, however, the two converter units 80 and 81 are intended to respond to a system of 4-digit binary code input functions. The use of 2-, 3-, and 4-digit code systems in these particular instances is for purposes of exemplification and not intended to limit the invention in these respects. Neither embodiment, therefore, is limited to the use of 2-, 3-, or 4-digit binary code input functions.

If designed to respond to a system of 4-digit binary code input functions the converter units 80 and 81, in combination, will impart a total of sixteen different decimalized functions to the lever 55, including an initial zero position. Independently, decimalized functions equal to 1, 2 and 3 are imparted to lever 55 from converter 81 with respect to fulcrum 56, and those equal to 4, 8 and 12 are imparted to said lever from converter 80 with respect to fulcrum 56*a*. All such lever displacements will take place in the direction of arrow 76 from an initial zero position.

Referring again to FIGURE 7, the symbol array of mask 64 may be extended to include a total of sixteen individual symbols as shown in the expanded array of mask 64*a* through the use of the embodiment of FIGURE 2. The array 64*a* is shown to include, for example, letters of the alphabet, A through P. The selection of these letters for impingement upon the light responsive medium 68 will be under the control of binary code input functions corresponding to 4-digit numerals 0000 through 1111, respectively.

In FIGURE 8, another photographic recorder means is shown which may be used in combination with the binary code converter embodiments described thus far with reference to FIGURES 1 and 2. An array of message symbols, 64 or 64*a*, may be supported adjacent to the one end 57 of the lever 55 in a plane substantially perpendicular to the lengthwise dimension of the lever 55. In this recorder, however, the cross section of individual symbols 65 referred to previously would be made transparent to light instead of being light reflective. Light from a light bulb source 77 is directed onto a light reflecting mirror 78 and allowed to pass through the transparent cross section of a message symbol aligned with the optical axis 73 of the recorder. Independent light beams, the cross section of which are representative, respectively, of message characters, or symbols, may thereby be derived from the array and imaged selectively by means of a lens system on the light responsive medium 68. As in the case of the recorder 63 in FIGURE 7, different ones of the independent light beams representing different message symbols will be caused to impinge upon the light responsive medium 68 in response to the impartment of decimalized functions to the lever 55. Photographic records may thereby be made in the form of message symbols, representing the decimalized counterparts of binary code input functions.

One of the more important features of the present printer improvements is in its ability to print alphanumeric characters, or symbols, of very good print quality at high rates of speed. This is particularly true of these improvements when combined with the force to motion converter, or actuator, of my copending application No. 81,561 referred to previously. An R.C. time constant of $200\times10^{-6}$ second, against a load equal to 2500 pounds per square inch, is well within the stress tolerance of the transducer shown and described in conjunction with the actuator of FIGURE 2 of the application No. 81,561. Utilizing this type of actuator, as the actuator 35, in combination with the printer embodiments of the present invention, printing speeds in excess of 300 characters per second may be realized. This invention lends itself very well to printing speeds of such rates as this by reason of the fact that each of the mechanical movements involved in its operation is of extremely small magnitude, in addition to the fact that the torque-to-inertia ratio of the control systems wherein such movements take place is relatively high.

A better understanding of the invention's high speed printing capabilities may be obtained from the following examination of a few pertinent dimensions and system parameters. The masks, for example, contain symbols which are not greater than 0.002″ in height. The center-to-center spacing of symbols in the masks need not be more than 0.003″ and, therefore, the distance from the center of the letter A to the center of the numeral 8 in the mask 64 will be no more than 0.021″. Pointing out these dimensions will serve to indicate that mask movements, or character presentations, from one character to the next will be equal to 0.003″, and that when the letter A is aligned with the optical axis 73 and it is necessary to align the numeral 8 with said axis the movement of the mask 64 will be equal to 0.021″.

In a combination comprising the binary code converter means of FIGURE 1 with the recorder means of FIGURE 7, the lever 55 may be used merely as a means of supporting the mask 64. Under such circumstances the linkage 56 will engage the lever 55 immediately adjacent to the movable end 57 of the latter and the mask 64. The lever 55, therefore, will serve as a convenient means by which the mask 64 will be supported and selectively positioned between the light source 67 and the light responsive record medium 68 so that different ones of the independently formed light beams representing different symbols may be caused to impinge upon the record medium 68. The lever 55 and the linkage 56 will serve as a 1:1, or a direct, means of linking the mask 64 to the output bearing 17, and thereby coupling the decimalized output functions of the converter unit 10 to corresponding mask positions. In view of this, the mask 64, the end 57 of the lever 55, the linkage 56, and the output bearing 17 will be displaced, respectively, a distance of 0.021″ with respect to the reference bearing 11 when the position of the mask 64 is changed from a letter A position to a numeral 8 position in response to a binary code input function corresponding to the binary numeral 111.

When the output bearing 17 is displaced 0.021″, the bearing 15 will be displaced 0.018″, and the bearing 13 will be displaced 0.012″. These latter displacements, however, will be with respect to the reference surface bearing 11, and under the control of displacements imparted to the bearings 16, 14 and 12, simultaneously in the direction of arrow 50. With regard to the magnitude of the displacements imparted to bearings 16, 14 and 12, and to the plungers 26, 25 and 24 associated therewith, the plunger 26 and bearing 16 will have been displaced 0.0015″; the plunger 25 and bearing 14 will have been displaced 0.003″; and the plunger 24 and bearing 12 will have been displaced 0.006″. A summation of these latter displacements equal 0.0105″, which is one half of the displacement of the output bearing 17, referred to above as 0.021″. However, a gain of two will be derived from the converter unit and subsequent alteration of the zig-zag side-by-side relationship of the bearings 11, 12, 13, 14, 15, 16 and 17.

Although a gain factor of two has been referred to at this point in the discussion, it should be understood that the converter is not necessarily limited in this respect. However, when the bearing 12 is displaced in the direction of arrow 50 between the bearings 11 and 13 a distance of 0.006″, the bearing 13 will be displaced in the direction of arrow 51 a distance of 2×0.006″, or 0.012″; when the bearing 14 is displaced in the direction of arrow 50, between the bearings 13 and 15 a distance of 0.003″, the bearing 15 will be displaced in the direction of arrow 51 a distance of 2×0.003″, or 0.006″; and when the bearing 16 is displaced in the direction of arrow 50 between the bearings 15 and 17 a distance of 0.0015″, the bearing 17 will be displaced in the direction of arrow 51 a distance of 2×0.0015″, or 0.003″. A summation of bearing 13, 15 and 17 displacements of 0.012″, 0.006″ and 0.003″, respectively, is equal to a total of 0.021″; the distance required to change the position of the mask 64 from the letter A position to the numeral 8 position. The mask may be selectively positioned to align characters intermediate the letter A and the numeral 8 with the optical axis 73 by the selective displacement of bearings 12, 14 and 16 in response to binary code input functions corresponding, respectively, to the binary numerals between 111 and 000.

In view of the above examination of the magnitude of mechanical movements involved in the selective positioning of mask 64 so that different ones of the light beams representing different alphanumeric symbols may be caused to impinge upon a record medium, it will be noted that the actuators 35 will be required to provide movements to the adjustable bearing surface means 19, 20 and 21 equal to the amounts of 0.006″, 0.003″ and 0.0015″, respectively. However, actuator movements in excess of these amounts will be controlled very precisely by the plungers 24, 25 and 26, as described previously in conjunction with FIGURES 5 and 6.

All of the dimensions and system parameters referred to thus far have been selected primarily for the purpose of providing a somewhat clearer picture of the operating principles of the invention and the manner in which the various parts and components are related. It should be understood by those skilled in the art, therefore, that the dimensions and parameters I have chosen to use in my treatment of the subject are for the purpose of experiment only. Although the plunger movements, the gain of the converter units, and the center-to-center spacings of the symbols on the masks are related, the size, configuration and characteristics of the parts concerned may vary considerably from those used in the discussion. The gain of the converter units, for example, may be a factor of two, a factor more than two, or a factor less than two. In either event the gain derived from these units is in part related to the angular deviations of the zig-zag course of the bearings from a straight line course. In the event circular ball, or roller, bearings are used, and a gain of two is desired in response to input functions to the converter unit, the angular deviations will be equal to an angle which is respectively greater than 45° when the bearings 12, 14 and 16 are in the digit-0 positions, and equal to an angle which is respectively less than 45° when these bearings are in digit-1 positions. And when the bearings 12, 14 and 16 are going through their respective change from digit-0 to digit-1 positions the average angle of their respective deviations from a straight line course will be 45°.

With regard to the magnitude of movements involved in the process of printing it may be desirable in certain applications of the invention to derive an additional gain in mask movements through the use of the lever 55, or, introduce a reduction in movements between the mask and the converter unit. While in certain other applications of the invention the lever 55 will be used to combine the respective output movements of several converter units as illustrated in FIGURES 2, 3 and 4. In a combination comprising the embodiment of FIGURE 2, and the recorder means of FIGURE 7, the lever 55 is not merely a mask support means but is in addition to this a flexable coupling means between the mask **64*a* and the converter units 80 and 81**.

The fulcrum 56 may engage the lever 55 at a point midway between the mask **64*a* adjacent to the one end 57 of the lever 55 and the point at which the fulcrum 56*a* engages the lever 55 adjacent to the opposite end 58 of said lever. Using the lever 55 in this manner allows it to serve as a means of providing a 1:1 coupling between the converter unit 81 and the mask 64*a*, and a 2:1 coupling between the converter unit 80 and the mask 64*a*. The latter contains sixteen letters, A through P, located respectively on 0.003″ centers. Since there are sixteen letters in the mask 64*a***, a positional change of 0.045″ will be required to change the position of the mask from a letter A position to that which corresponds to a letter P position.

An analysis of the movements involved between the mask **64*a* and the reference bearing surface means 11 of the respective converter units 80 and 81 will show that the position of the mask 64*a* may be changed from letter positions A through D by means of decimalized functions derived from the converter unit 81 and then from letter positions D through P by the additional decimalized functions derived from the converter unit 80. The center-to-center spacing from the letters A to D is equal to 0.009″. Since there is a 1:1 coupling between the converter unit 81 and the mask 64*a*, a movement of 0.009″ by the mask will be followed by a 0.009″ displacement of the output bearing 17 of the unit 81. The center-to-center spacing from the letters D to P is equal to 0.036″. Since there is a 2:1 coupling between the converter unit 80 and the mask 64*a*, a movement of 0.036″ by the mask will be followed by a 0.018″ displacement of the output bearing 17 of the unit 80**.

In the converter unit 81 the output bearing 17 displacement of 0.009″ will be followed by a bearing 15 displacement of 0.006″. Each of these displacements being in the direction of arrow 51 and with respect to the reference bearing surface means 11. The bearing 16 and plunger 26 associated therewith will be displaced 0.0015″, and the bearing 14 and its plunger 25 will be displaced 0.003″. A summation of these displacements equal 0.0045″, which is one half of the displacement of the output bearing 17, or 0.009″. However, a gain of two will be derived from the converter unit 81. A displacement of bearing 16 of 0.0015″ will be followed by a 0.003″ displacement of bearing 17, and a 0.003″ displacement of bearing 14 will be followed by a 0.006″ displacement of bearing 15, imparting a combined displacement of 0.009" to the output bearing 17.

In the converter unit 80 the output bearing 17 displacement of 0.018" will be followed by a bearing 13 displacement of 0.012". Each of these displacements will be in the direction of arrow 51 and with respect to the reference bearing surface means 11. The bearing 14 and plunger 25 associated therewith will be displaced 0.003", and bearing 12 and its plunger 24 will be displaced 0.006". A summation of these displacments equal 0.009", which is one half the displacement of the output bearing 17, or 0.018". A gain of two, however, will be derived from the converter unit 80. A 0.003" displacement of bearing 14 will be followed by a 0.006" displacement of bearing 17, and a 0.006" displacement of bearing 12 will be followed by a 0.012" displacement of bearing 13, imparting a combined displacement of 0.018" to the output bearing 17. Again, it should be understood that the particular values I have attached to the movement of the bearings, plungers and lever in the foregoing discussion were for illustrative purposes.

In FIGURE 3, the end 57 of the lever 55, and also a light beam symbol forming mask supported adjacent thereto, is positionable in both horizontal and vertical directions under the control of horizontally and vertically oriented converter units 10*h* and 10*v*, respectively. The operation of these units is, in principle, equal to that of the converter units 80 and 81 in FIGURE 2, and converter unit 10 in FIGURE 1. Furthermore, the embodimen of FIGURE 3 may be used in combination with either the recorder means of FIGURE 7, or with that of FIGURE 8, however, a light beam symbol forming mask containing beam forming areas substantially non-serially aligned in conformance with a set of binary code signals will be supported adjacent to the end 57 of the lever 55. Examples of such masks are shown in FIGURES 9 and 10. Each of these masks are intended to contain a matrix of beam forming areas arranged in a system of coordinates adapted to convert a set of binary code signals into corresponding alphanumeric symbols. The beam forming areas may be light reflecting surfaces or windows through which light may pass.

The converter units 10*h* and 10*v* may each contain one or more plungers smilar to those plungers 24, 25 and 26 described and included in the embodiment of FIGURE 1. If each converter unit 10*h* and 10*v* were to utilize two plungers, they may be adapted to respond in combination to a system of 4-digit binary code input functions. Input functions corresponding to the first two digits of a 4-digit binary code signal will be imparted to the two plungers of the horizontal converter unit 10*h*, and input functions corresponding to the second two digits of the 4-digit binary code input signal will be imparted to the two plungers of the vertical converter unit 10*v*. The application of 2-digit input functions to the converter unit 10*h* will provide the selective positioning of the mask in a horizontal direction and thereby effect the selective alignment of the columns of beam forming areas of the matrix with the optical axis of the recorder means. The application of 2-digit input functions to the converter unit 10*v* will provide the selective positioning of mask in a vertical direction and thereby effect the selective alignment of the rows of beam forming areas of the matrix with the optical axis of the recorder means.

If the converter unit 10*h* and 10*v* of the embodiment in FIGURE 3 are each provided with a set of three plungers, the combined effect of the two converters 10*h* and 10*v* in response to a system of 6-digit binary code input functions would provide for the selective positioning of a beam forming mask containing eight columns and eight rows of beam forming areas. An example of such a mask is shown in FIGURE 9, wherein there are sixty-four individual points at which individual beam forming areas may be located and aligned in a system of coordinates to conform with a set of binary code signals.

Decimalized functions derived from the combination of converter units 10*h* and 10*v*, which functions would be substantially proportional to the value of a 6-digit set of binary code signals, will be adapted to position the beam forming mask so that different ones of the sixty-four light beams representing different alphanumeric symbols may be caused to impinge upon a record medium and provide a record thereof. The first three digits, numerals 000 through 111, of a 6-digit code will be utilized to selectively control the positioning of the eight columns of beam forming areas in the mask. A second three digits, numerals through 000 through 111, of the 6-digit code will be utilized to selectively control the positioning of the eight rows of beam forming areas in the mask.

Referring now to FIGURE 4, the end 57 of the lever 55 in this embodiment is positionable in both the horizontal direction and the vertical direction, under the control of horizontally and vertically oriented converter unit 80*h* and 81*h*, and 80*v* and 81*v*. In the sense that this embodiment provides both the horizontal and vertical positioning of a beam forming mask it is similar to that of FIGURE 3, however, this embodiment represents a further modification of the invention described in connection with FIGURES 2. It may also be used in combination with either the recorder means of FIGURE 7, or with that of FIGURE 8, wherein the beam forming mask would contain beam forming areas arranged in a manner described in connection with FIGURES 9 and 10, and supported adjacent to the end 57 of the lever 55.

The first pair of converter units 80*h* and 81*h* are adapted to impart decimalized functions to the lever 55, for example, in a horizontal direction, and the second pair of converter units 80*v* and 81*v* are adapted to impart decimalized functions to said lever in a vertical direction. The first pair 80*h* and 81*h*, therefore, is displaced 90° from the second pair 80*v* and 81*v*, with respect to the longitudinal axis of the lever 55, permitting a beam forming mask supported adjacent to the end 57 of the lever 55 to be selectively positioned both horizontally and vertically. If each of the converter units 80*h*, 81*h*, 80*v* and 81*v*, are provided with a set of two plungers, the combined effect of the four units in response to a system of 8-digit binary code input functions would provide for the selective positioning of a beam forming mask containing sixteen columns and sixteen rows of beam forming areas. An example of such a mask is shown in FIGURE 10, wherein, there are two hundred fifty-six individual points at which individual beam forming areas may be located and non-serially aligned in a system of coordinates so that they may conform to an 8-digit set of binary code signals. The first four digits, numerals 0000 through 1111, of an 8-digit code will be used to selectively control the positioning of the sixteen columns of beam forming areas in the mask, and the second four digits, 0000 through 1111, of the code signals will be used to selectively control the positioning of the sixteen rows of beam forming areas in the mask.

The combination of decimalized functions derived from the converter units 80*h*, 80*v*, 81*h* and 81*v*, will be substantially proportional to the value of the 8-digit set of binary code signals. The output bearings 17 of the respective converter units are adapted to position the beam forming mask so that different ones of a possible two hundred fifty-six light beams representing different alphanumeric symbols may be presented to, and thereby caused to impinge upon, the record medium 68.

Figure 11:
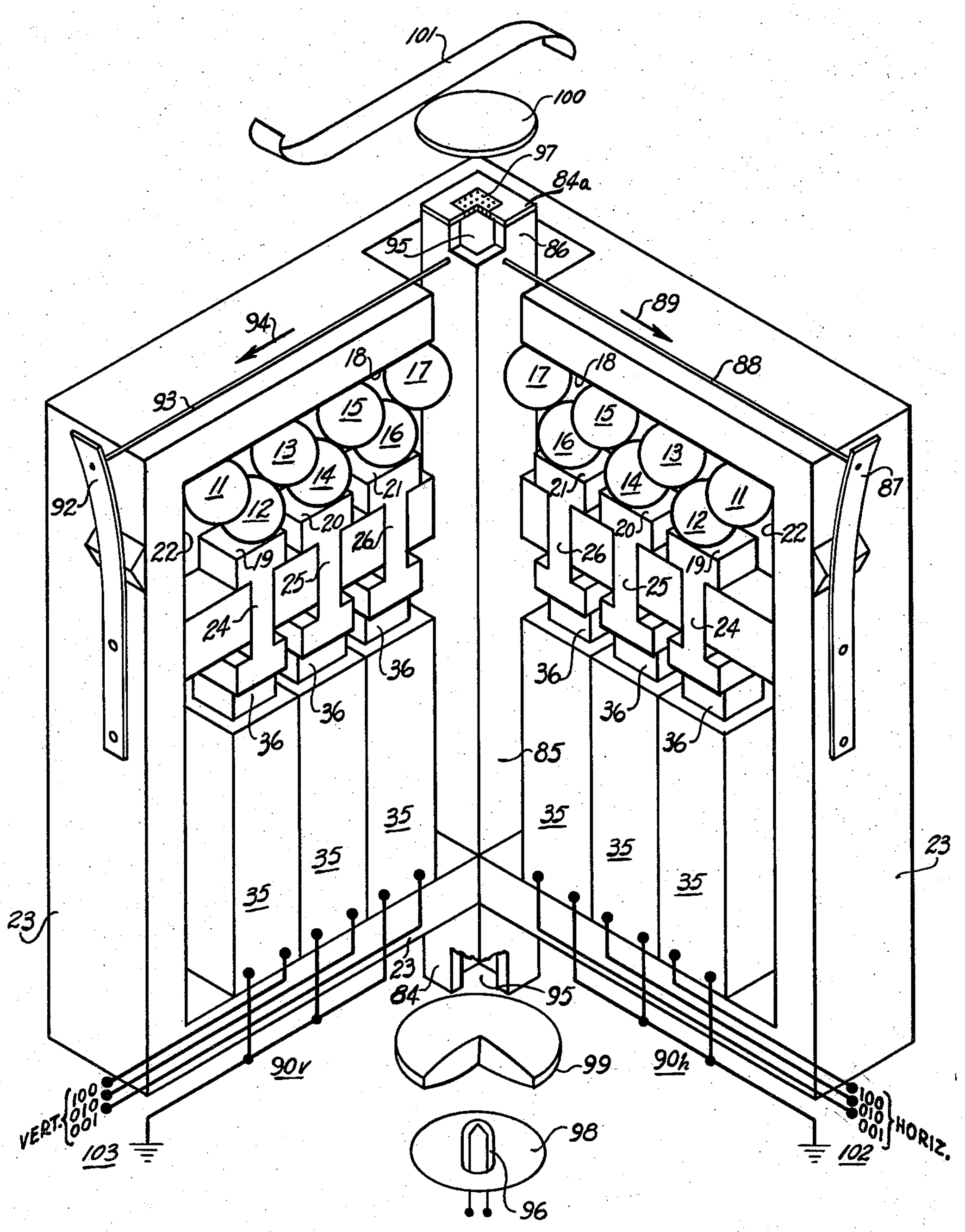
FIGURE 11 shows a further embodiment of my binary code to decimal converter and alphanumeric symbol presentation apparatus.

Referring now to FIGURE 11, a further embodiment of the invention is shown wherein the one end 84 of a lever 85 is firmly supported in the frame 23 which also houses a pair of converter units 90*h* and 90*v*. The opposite end 86 of the lever 85, on which there is mounted a beam forming mask 84*a* of the type described and shown in FIGURE 9, may be displaced with respect to the firmly supported end 84 under the control of decimalized displacements imparted to the lever 85 by means of the converter units 90h and 90v. Although the lever 85 is firmly supported at one end 84, the lever 85 is elastic to the extent necessary to permit the opposite end 86 to respond to displacements imparted to it in accordance with the requirements of the invention. The materials from which the lever 85 may be constructed could be metals such as brass or steel, or even glass or plastics.

The movable end 86 of the lever 85 is biased aginst the output bearing 17 of the respective converter units 90h and 90v, by means of an external restraining force. The restraining force from a spring 87, which is attached to the lever 85 by means of a connecting rod 88, is exerted in the direction of arrow 89, thereby forcing the lever 85 against the output bearing 17 of the horizontal converter unit 90h. The restraining force from a second spring 92, which is attached to the lever 85 by means of a connecting rod 93, is exerted in the direction of arrow 94, thereby forcing the lever 85 against the output bearing 17 of the vertical converter unit 90v. Since the beam forming mask is supported on the movable end 86 of the lever 85 the mask will be selectively positioned in both the horizontal and vertical directions in response to the decimalized functions imparted to the lever.

The lever 85 is shown to contain an opening 95 which is coaxial therewith and extends from the one end 84 to the opposite end 86 thereof, so that the beam of light from a light source 96 may pass uninterrupted to a matrix of beam forming areas 97 in the mask at the end 86 of the lever 85. If, however, the lever is made of a transparent material such as glass or plastic and, therefore, comprising in effect an optical rod, light from the source 96 may then actually pass through the material of the lever. Although the lever 85 is provided with an opening 95 for the passage of a light beam, an opening such as this may be dispensed with by supporting the lever parallel to the light beam and to one side of it. The matrix 97 of beamforming areas would then be supported by the end 86 of a lever 85 in a cantilever manner, thereby allowing the matrix 97 to project outward from the lever and in the path of the beam of light. Under any of the above conditions regarding the lever 85, a beam of light from the light source 96 will be allowed to follow a straight-line optical path to the mask. The light source 96 is provided with a reflector 98 and a lens system 99, making it possible to illuminate only that symbol in the matrix of beam forming areas 97 which has been aligned with the optical axis of the recorder means. Another lens system 100 of the recorder means will image the illuminated symbol on the light responsive record medium 101.

The operating principles of the converter units 90h and 90v in this embodiment are identical to those described in connection with the other embodiments of this invention. Each of the converter units 90h and 90v contain a series of bearings 11, 12, 13, 14, 15, 16 and 17, which adjoin one another in a zig-zag side-by-side relationship. The external restraining force of the respective springs 87 and 92 holds the bearings 11, 13, 15 and 17 of each series against the adjacent surface 18 on the one side, and the bearings 12, 14 and 16, respectively, against the adjustable surfaces 19, 20 and 21 on the opposite side. The reference bearing 11 of each series is also held against a surface 22.

6-bit binary code input signals will be coupled in parallel to three horizontal input circuit terminals 102 and to three vertical input circuit terminals 103, to selectively energize a set of six actuators 35. As described previously, the matrix of alphanumeric symbol beam forming areas 97 in the mask are aligned therein to conform to predetermined sets of binary code input signals. When a given set of binary code signals are coupled to the input circuit terminals 102 and 103, the actuators 35 energized thereby will impart force and motion to their corresponding plungers to alter the zig-zag side-by-side relationship of the series of bearings of the respective horizontal and vertical converter units 90h and 90v, in accordance with a given set of binary code signals. The decimalized functions derived from the converter units 90h and 90v will be imparted to the lever 85 which will position the array of beam forming areas both horizontally and vertically. A light beam representing a symbol corresponding to the given set of binary code signals will be caused to impinge upon the light responsive record medium 101 and provide a record of the code related symbol. Upon receiving a code signal the light source 96 may be turned On and then Off.

In accordance with the stated objectives of my invention, it is my belief that the apparatus described herein represents a binary code actuated alphanumeric symbol presentation and recorder means of real importance to certain areas of the communications and graphic arts fields. Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for converting binary code input functions to decimalized output functions comprising: a lever; a lever support means in relation to which decimalized output functions will be imparted to said lever; a reference bearing means; means intermediate said lever and said reference bearing means for deriving a decimalized function substantially proportional to the value of binary code input functions and adapted to impart a decimalized output function to said lever; the last stated means including a plurality of individual bearings resting one against the other in a nonconnective zig-zag formation and selectively resting against surface members on opposite sides of said zig-zag formation, and means for applying binary code input functions to predetermined surface members to thereby alter said zig-zag formation intermediate said reference bearing means and said lever and impart a decimalized function to said lever.

2. Apparatus for converting binary code input functions to decimalized output functions comprising: a lever; a lever support means in relation to which decimalized output functions will be imparted to said lever; a reference bearing means; means intermediate said lever and said reference bearing means for deriving a decimalized function substantially proportional to the value of binary code input functions; the last stated means comprising a series of individual bearings adjoining one another in a zig-zag unattached side-by-side relationship and selectively resting against, and in sliding contact adjacency to, surface members on opposite sides of said series of bearings; and means for applying binary code input functions to surface members adjacent to bearings on one side of said series of bearings to thereby selectively alter the zig-zag side-by-side relationship of said series of bearings, derive a decimalized function therefrom, and impart said decimalized function to said lever.

3. Apparatus for converting binary code input functions to decimalized output functions comprising: a lever; a series of separate bearings adjoining one another in a zig-zag disconnected side-by-side relationship and selectively adjacent to, and in sliding contact with, surface members on opposite sides of said series of bearings; a reference bearing means at one end of said series of bearings; output bearing means at the opposite end of said series of bearings adapted to adjoin said lever thereto; and means for applying binary code input functions to surface members adjacent to bearings on one side of said series of bearings to thereby selectively alter the zig-zag side-by-side relationship of said series of bearings with respect to said reference bearing means, derive a decimalized function therefrom substantially proportional to the value of said binary code input functions, and impart said decimalized function selectively to said output bearing means and to said lever.

4. Apparatus for converting binary code input functions to decimalized output functions comprising: a lever; lever support means in relationship to which decimalized output functions will be imparted to said lever; a plurality of reference bearing means; and a plurality of converter means intermediate said lever and respective reference bearing means of said plurality of reference bearing means for deriving a decimalized function substantially proportional to the value of binary code input functions and adapted to impart said decimalized function to said lever; each of said converter means including a plurality of individual bearings resting one against the other in a nonconnective zig-zag formation and selectively resting against surface members on opposite sides of said zig-zag formation, and means for applying binary code input functions to predetermined surface members to thereby alter said zig-zag formation intermediate said reference bearing means and said lever and impart a decimalized function to said lever.

5. Apparatus for converting binary code input functions to decimalized output functions comprising: a lever; a plurality of fulcrums about which decimalized output functions may be imparted to said lever; a plurality of series of bearings wherein each series individual bearings rest one against the other in a zig-zag sliding contact side-by-side relationship and said bearings are selectively in a sliding contact adjacency with surface members on opposite sides of each of said series of bearings; reference bearing means at one end of each of said series of bearings; means at the opposite end of each of said series of bearings by which said lever is adjoined thereto; and means for applying binary code input functions to surface members adjacent to bearings on one side of each of said series of bearings to thereby selectively alter the zig-zag side-by-side relationship of each of said series of bearings with respect to said reference bearing means, derive a decimalized function therefrom substantially proportional to the value of said binary code input functions, and impart said decimalized function to said lever.

6. Apparatus for providing a record of binary code input functions comprising: a lever; lever support means in relation to which said lever will be displaced; recorder means adjacent to one end of said lever and adapted to provide a record of displacements imparted to said lever; a reference bearing means; and means intermediate said lever and said reference bearing means for deriving lever displacement functions substantially proportional to the value of binary code input functions, adapted to impart said displacement functions to said lever and to provide for a recording thereof; the last stated means including a plurality of individual bearings resting one against the other in a nonconnective zig-zag formation and selectively resting against surface members on opposite sides of said zig-zag formation, and means for applying binary code input functions to predetermined surface members to thereby alter said zig-zag formation intermediate said reference bearing means and said lever and impart a decimalized function to said lever; said surface members being provided with a way along which said zig-zag formation of bearings will be adapted to slide.

7. Apparatus for providing a record of binary code input functions comprising: a lever; lever support means about which said lever will be displaced; recorder means adjacent to one end of said lever and adapted to provide a record of displacements imparted to said lever; a series of individual bearings adjoining one another in a zig-zag disconnected side-by-side relationship and selectively adjacent to, and in sliding contact with, surface members on opposite sides of said series of bearings; output bearing means at the opposite end of said series of bearings by which said lever is adjoined thereto; and means for applying binary code input functions to surface members adjacent to bearings on one side of said series of bearings to thereby selectively alter the zig-zag side-by-side relationship of said series of bearings with respect to said reference bearing means, impart a displacement to said lever substantially proportional to the value of said binary code input functions, and provide for the making a record thereof.

8. Apparatus for providing a record of binary code input functions comprising: a lever; a plurality of fulcrums about which said lever may be displaced; recorder means adjacent to one end of said lever and adapted to make a record of displacements imparted thereto; a plurality of reference bearing means; and converter means intermediate said lever and each of said reference bearing means adapted to selectively impart displacements to said lever in response to binary code input functions, and provide for the making a record thereof; said converter means including a plurality of individual bearings resting one against the other in a nonconnective zig-zag formation and selectively resting against surface members on opposite sides of said zig-zag formation, and means for applying binary code input functions to predetermined surface members to thereby alter said zig-zag formation intermediate said reference bearing means and said lever whereby said lever will be displaced selectively about said fulcrums in response to binary code input functions.

9. Apparatus for providing a record of binary code input functions comprising: a lever; a plurality of fulcrums about which said lever may be displaced; recorder means adjacent to one end of said lever adapted to make a record of displacements imparted thereto; a plurality of series of bearings wherein each series individual bearings rest one against the other in a zig-zag sliding contact side-by-side relationship and said bearings are selectively in a sliding contact adjacency with surface members on opposite sides of each of said series of bearings; reference bearing means at one end of each of said series of bearings; means at the opposite end of said series of bearings by which said lever is adjoined thereto; and means for applying binary code input functions to surface members adjacent to bearings on one side of each of said series of bearings to thereby selectively alter the zig-zag side-by-side relationship of each of said series of bearings with respect to said reference bearing means, impart displacements to said lever substantially proportional to the value of said binary code input functions, whereby said lever will be displaced selectively about said fulcrums and provide for the making a record thereof.

10. A photographic recorder capable of responding to binary code input functions comprising: a lever; means for supporting an array of message symbols adjacent to one end of said lever in a plane substantially perpendicular to the length thereof; means for deriving from said array independent light beams the cross section of which are representative, respectively, of said message symbols; converter means for deriving decimalized functions substantially proportional to the value of binary code input functions; lever support means about which said decimalized functions will be imparted to said lever; recorder means including a light responsive medium; and means for imparting said decimalized functions to said lever so that different ones of said light beams representing different message symbols may be caused to impinge upon said light responsive medium; said converter means including a plurality of individual bearings resting one against the other in an unattached zig-zag formation and selectively resting against surface members on opposite sides of said zig-zag formation; reference bearing means at one end of said zig-zag formation and means at an opposite end thereof by which said lever is adjoined thereto; and means for applying binary code input functions to predetermined surface members to thereby alter said zig-zag formation intermediate said reference bearing means and said lever and impart a decimalized function to said lever.

11. A photographic recorder capable of responding to binary code input functions comprising: a lever; means for supporting an array of message symbols adjacent to one end of said lever in a plane substantially perpendicular to the length thereof; means for deriving from said array independent light beams the cross section of which are representative, respectively, of said message symbols; converter means for deriving decimalized functions substantially proportional to the value of binary code input functions including a series of individual bearings adjoining one another in a zig-zag unattached side-by-side relationship and selectively adjacent to and in sliding contact with surface members on opposite sides of said series of bearings, a reference bearing at one end of said series of bearings, and means at the opposite end of said series of bearings by which said lever is adjoined thereto; a fulcrum about which said decimalized functions may be imparted to said lever; a recorder including a light responsive medium; and means for applying said binary code input functions to said surface members adjacent to one side of said series of bearings and thereby impart said decimalized functions to said lever so that different ones of said light beams representing different message symbols may be caused to impinge upon said light responsive medium.

12. A photographic recorder capable of responding to binary code input functions comprising: a lever; means for supporting an array of message symbols adjacent to one end of said lever in a plane substantially perpendicular to the length thereof; means for deriving from said array independent light beams the cross section of which are representative, respectively, of said message symbols; converter means for deriving a combination of decimalized functions substantially proportional to the value of binary code input functions; lever support means in relation to which said combination of decimalized functions may be imparted to said lever; a recorder including a light responsive medium; and means for imparting said combination of decimalized functions to said lever so that different ones of said light beams representing different message symbols may be caused to impinge upon said light responsive medium; said converter means including a plurality of series of bearings wherein each series individual bearings rest one against the other in an unattached zig-zag formation and rest selectively against surface members on opposite sides of said zig-zag formation and in sliding contact therewith; reference bearing means at one end of each of said series of bearings and means at an opposite end thereof by which said lever is adjoined thereto; and means for applying binary code input functions to predetermined surface members to thereby alter the zig-zag formations of said series of bearings intermediate said reference bearing means and said lever and impart decimalized functions to said lever.

13. A photographic recorder capable of responding to binary code input functions comprising: a lever; means for supporting an array of message symbols adjacent to one end of said lever in a plane substantially perpendicular to the length thereof; means for deriving from said array independent light beams the cross section of which are representative, respectively, of said message symbols; converter means for deriving a combination of decimalized functions substantially proportional to the value of binary code input functions including a plurality of series of individual bearings wherein each of said series the bearings adjoin one another in a zig-zag unattached side-by-side relationship and are selectively adjacent to and in sliding contact with surface members on opposite sides of said series of bearings, a reference bearing means at one end of each of said series of bearings, and means at the opposite end of each of said respective series of bearings by which said lever is adjoined thereto; lever support means about which said combination of decimalized functions will be imparted to said lever; recorder means including a light responsive medium; and means for applying said binary code input functions to said surface members adjacent to one side of each of said series of bearings and thereby impart said combination of decimalized functions to said lever so that different ones of said light beams representing different message symbols will be caused to impinge upon said light responsive medium.

14. A photographic alphanumeric symbol recorder capable of responding directly to binary code input functions comprising a light source for generating a light beam, a light responsive record medium, a selectively positionable beam forming mask interposed between said light source and said record medium for providing independent light beams the cross section of which are representative, respectively, of alphanumeric symbols, a reference bearing means, converter means between said beam forming mask and said reference bearing means for deriving a decimalized function substantially proportional to the value of said binary code input functions and adapted to position said beam forming mask so that different ones of said light beams representing different alphanumeric symbols will be caused to impinge upon said record medium and provide a record thereof; said converter means including a zig-zag side-by-side arrangement of individual disconnected bearings resting one against the other and selectively resting against surface members on opposite sides of said arrangement of bearings, said reference bearing means being adjacent one end of said arrangement of bearings and means at an opposite end thereof by which said mask is adjoined thereto, said surface members being provided with a way along which bearings of said arrangement will be adapted to slide, and means for applying binary code input functions to predetermined surface members to thereby alter said arrangement of bearings intermediate said reference bearing means and said mask and derive a decimalized function therefrom.

15. A photographic alphanumeric symbol recorder capable of responding to binary code input functions comprising a light source for generating a light beam, a light responsive record medium, a selectively positionable beam forming mask interposed between said light source and said record medium for providing independent light beams the cross section of which are representative, respectively, of alphanumeric symbols, converter means for deriving a decimalized function substantially proportional to the value of said binary code input functions including a series of individual bearings adjoining one another in a zig-zag unattached side-by-side relationship and selectively adjacent to and in sliding contact with a surface member on one side of said series of bearings and adjacent to and in sliding contact with a plurality of adjustable surface members on the opposite side of said series of bearings, a reference bearing means at one end of said series of bearings, an output bearing means at the opposite end of said series of bearings adapted to means by which said decimalized function will be converted to a corresponding mask position, means for applying said binary code input functions to said adjustable surface members to, selectively, alter the zig-zag side-by-side relationship of said series of bearings with respect to said reference bearing means, position said mask so that different ones of said light beams representing different alphanumeric symbols may be caused to impinge upon said record medium, and provide a record thereof.

16. A photographic alphanumeric symbol recorder capable of responding to binary code input functions comprising a light source for generating a light beam, a light responsive record medium, a selectively horizontally and vertically positionable beam forming mask interposed between said light source and said record medium for providing independent light beams the cross section of which are representative, respectively, of alphanumeric symbols, converter means for deriving decimalized functions substantially proportional to the value of said binary code input functions including at least two series of bearings wherein in each series individual unattached bearings rest one against the other in a predetermined zig-zag side-by-side relationship and are selectively adjacent to and in sliding contact with a surface member on one side of each series of bearings and adjacent to and in sliding contact with a plurality of adjustable surface members on the opposite side of each series of bearings, reference bearing means at one end of each series of bearings, means adapted to the opposite end of one of said series of bearings to convert a decimalized function to a corresponding horizontal mask position and means adapted to the opposite end of the other of said series of bearings to convert a decimalized function to a corresponding vertical mask position, means for applying said binary code input functions to said adjustable surface members to selectively alter the said predetermined zig-zag side-by-side relationship of each of the said series of bearings with respect to said reference bearing means to thereby position said mask both horizontally and vertically so that different ones of said light beams representing different alphanumeric symbols will be caused to impinge upon said record medium to provide a record thereof.

17. A photographic recorder means capable of providing a printed record of alphanumeric symbols in response to a predetermined set of binary code signals, said recorder means including a light source for generating a light beam, a light responsive record medium, a selectively horizontally and vertically positionable beam forming mask interposed between said light source and said record medium and presenting alphanumeric symbol-shaped beam forming areas substantially non-serially aligned in conformance with said set of binary code signals for providing independent light beams the cross section of which are representative, respectively, of said alphanumeric symbols, said beam forming areas being arranged in a system of coordinates, the coordinate arrangement being adapted to convert said set of binary code signals into corresponding alphanumeric symbols, reference bearing means, converter means between said beam forming mask and said reference bearing means for deriving decimalized functions substantially proportional to the value of said set of binary code signals and adapted to position said beam forming mask horizontally and vertically so that light beams representing alphanumeric symbols corresponding to said set of binary code signals will be caused to impinge upon said record medium and provide a printed record thereof, said converter means including a horizontally related series of bearings and a vertically related series of bearings wherein each series individual unattached bearings rest one against the other in a predetermined zig-zag arrangement and rest selectively against surface members on opposite sides of said zig-zag arrangement in an unattached and sliding contact contiguousness, said reference bearing means being at one end of each of said series of bearings and means at an opposite end thereof by which said mask is adjoined thereto, and means for applying binary code functions corresponding to the value of said set of binary code signals to predetermined surface members, respectively, in sliding contact with said horizontally related and vertically related series of bearings to thereby alter the zig-zag arrangement thereof intermediate their respective reference bearing means and said mask and impart decimalized functions to said mask.

18. A photographic recorder means capable of providing a printed record of alphanumeric symbols in response to a predetermined set of binary code signals, said recorder means including a light source for generating a light beam, a light responsive record medium, a selectively horizontally and vertically positionable beam forming mask interposed between said light source and said record medium and presenting alphanumeric symbol-like beam forming areas substantially non-serially aligned in conformance with said set of binary code signals for providing independent light beams the cross section of which are representative, respectively, of said alphanumeric symbols, said beam forming areas being arranged in a system of coordinates, the coordinate arrangement being adapted to convert said set of binary code signals into corresponding alphanumeric symbols, converter means for deriving decimalized functions substantially proportional to the value of said set of binary code signals including at least two series of bearings wherein each series individual unattached bearings rest one against the other in a predetermined zig-zig side-by-side relationship and rest selectively adjacent to a surface member on one side thereof and a plurality of adjustable surface members on the opposite side thereof in an unattached and sliding contact contiguousness, reference bearing means at one end of each of said series of bearings, means adapted to the opposite end of one of said series of bearings to position said mask horizontally, means adapted to the opposite end of the other one of said series of bearings to position said mask vertically, means for altering the predetermined zig-zag side-by-side relationship of each of said series of bearings with respect to said reference bearing means to thereby position said mask both horizontally and vertically so that different ones of said light beams representing alphanumeric symbols corresponding to said set of binary code signals will be caused to impinge upon said record medium and provide a printed record thereof.

19. A photographic recorder means for providing a printed record of alphanumeric symbols in response to a predetermined set of binary code signals, said recorder means including a light source for generating a light beam, a light responsive record medium, a lever, means for supporting a selectively horizontally and vertically positionable mask adjacent one end of said lever in a plane substantially perpendicular to the lengthwise dimension thereof and intermediate said light source and said record medium, said mask presenting alphanumeric symbol beam forming areas substantially non-serially aligned in conformance with a set of binary code signals for providing independent light beams the cross section of which are representative, respectively, of said alphanumeric symbols, said beam forming areas being arranged in a series of coordinates, the coordinate arrangement being adapted to convert said set of binary code signals into corresponding alphanumeric symbols, reference bearing means, converter means between said lever and said reference bearing means for deriving decimalized functions substantially proportional to the value of said set of binary code signals and adapted to position said beam forming mask horizontally and vertically so that light beams representing alphanumeric symbols corresponding to said set of binary code signals may be caused to impinge upon said record medium and provide a printed record thereof, said converter means including a horizontally related series of bearings and a vertically related series of bearings wherein each series individual unattached bearings rest one against the other in a predetermined zig-zag arrangement and rest selectively against surface members on opposite sides of said zig-zig arrangement in an unattached and sliding contact contiguousness, said reference bearing means being at one end of each of said series of bearings and means at an opposite end thereof by which said mask is adjoined thereto, and means for applying binary code functions corresponding to the value of said set of binary code signals to predetermined surface members, respectively, in sliding contact with said horizontally related and vertically related series of bearings to thereby alter the zig-zag arrangement thereof intermediate their respective reference bearing means and said mask and impart decimalized functions to said mask.

20. Apparatus for converting binary code input functions to decimalized output functions comprising:

(*a*) a reference bearing means;
(*b*) an output bearing means;
(*c*) a predetermined zig-zag side-by-side arrangement of individual unattached bearings resting one against the other and selectively resting against surface members on opposite sides of said arrangement of bearings in an unattached and sliding contact contiguousness;

(*d*) said reference bearing means being adjacent one end of said arrangement of bearings;

(*e*) said output bearing means being adjacent an opposite end of said arrangement of bearings;

(*f*) said surface members being provided with a way along which said arrangement of bearings will be adapted to slide;

(*g*) and means for applying binary code input functions to predetermined surface members to thereby selectively alter said predetermined zig-zag side-by-side arrangement of bearings, derive a decimalized function therefrom substantially proportional to the value of said binary code input functions, and impart said decimalized function to said output bearing means.

References Cited in the file of this patent

UNITED STATES PATENTS

| | | |
|---|---|---|
| 2,077,962 | Smith | Apr. 20, 1937 |
| 2,481,648 | Dehn | Sept. 13, 1949 |
| 2,596,741 | Tyler et al. | May 13, 1952 |
| 2,649,027 | Mason | Aug. 18, 1953 |
| 2,885,475 | Canepa | May 5, 1959 |
| 2,901,914 | Preston | Sept. 1, 1959 |
| 2,916,205 | Litz | Dec. 8, 1959 |
| 2,983,187 | Bone | May 9, 1961 |
| 3,024,976 | Wales | Mar. 13, 1962 |

FOREIGN PATENTS

| | | |
|---|---|---|
| 1,076,422 | France | Apr. 21, 1954 |